United States Patent
Fujita et al.

(10) Patent No.: US 6,745,472 B2
(45) Date of Patent: Jun. 8, 2004

(54) MANUFACTURING METHOD OF STEEL BALL FOR ROLLING BEARING

(75) Inventors: Yoshiki Fujita, Ikoma-gun (JP); Hajime Tazumi, Higashiosaka (JP); Kazuyuki Nishikita, Kitakatsuragi-gun (JP); Hideji Yoshida, Kitakatsuragi-gun (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/183,236

(22) Filed: Jun. 27, 2002

(65) Prior Publication Data

US 2003/0037439 A1 Feb. 27, 2003

(30) Foreign Application Priority Data

Jun. 28, 2001 (JP) .................... P2001-196196

(51) Int. Cl.7 ............................... B21K 1/02
(52) U.S. Cl. ............... 29/899; 29/898.069; 72/356; 72/377
(58) Field of Search ............... 29/898.069, 899; 72/356, 377

(56) References Cited

U.S. PATENT DOCUMENTS

| | | | |
|---|---|---|---|
| 801,338 A | * | 10/1905 | Reid |
| 1,204,127 A | * | 11/1916 | Canda |
| 1,431,183 A | * | 10/1922 | Rockwell |
| 2,313,876 A | | 3/1943 | Jelinek |
| 2,614,317 A | | 10/1952 | Deussen |
| 3,314,278 A | * | 4/1967 | Bergman |
| 3,791,188 A | | 2/1974 | Deussen |
| 3,965,554 A | * | 6/1976 | Amos |
| 4,044,588 A | | 8/1977 | Haines |
| 5,050,419 A | * | 9/1991 | Schindler et al. |
| 2003/0088979 A1 | * | 5/2003 | Tomita et al. |

FOREIGN PATENT DOCUMENTS

| | | |
|---|---|---|
| DE | 260442 | 5/1913 |
| DE | 930745 | 7/1955 |
| EP | 1098098 | 5/2001 |
| JP | 08-218150 | * 2/1995 |
| JP | 2001-170737 | 6/2001 |

* cited by examiner

Primary Examiner—David P. Bryant
Assistant Examiner—Eric Compton
(74) Attorney, Agent, or Firm—Jordan and Hamburg, LLP

(57) ABSTRACT

A method of manufacturing a steel ball for a rolling bearing, said method comprising: a molding step of forming a steel wire cut at a predetermined length into a raw ball having a band portion by a pair of molding forms having respectively hemispherical concave portions and relief grooves in peripheries of said concave portions on their respective opposing faces, said band portion being formed on a surface of said raw ball along said relief grooves by compressing said steel wire by said molding forms in a state in which both ends of said steel wire are sandwiched between said concave portions; and a tumbler working step of removing said band portion from the surface of the raw ball by tumbling.

12 Claims, 8 Drawing Sheets

F I G. 1
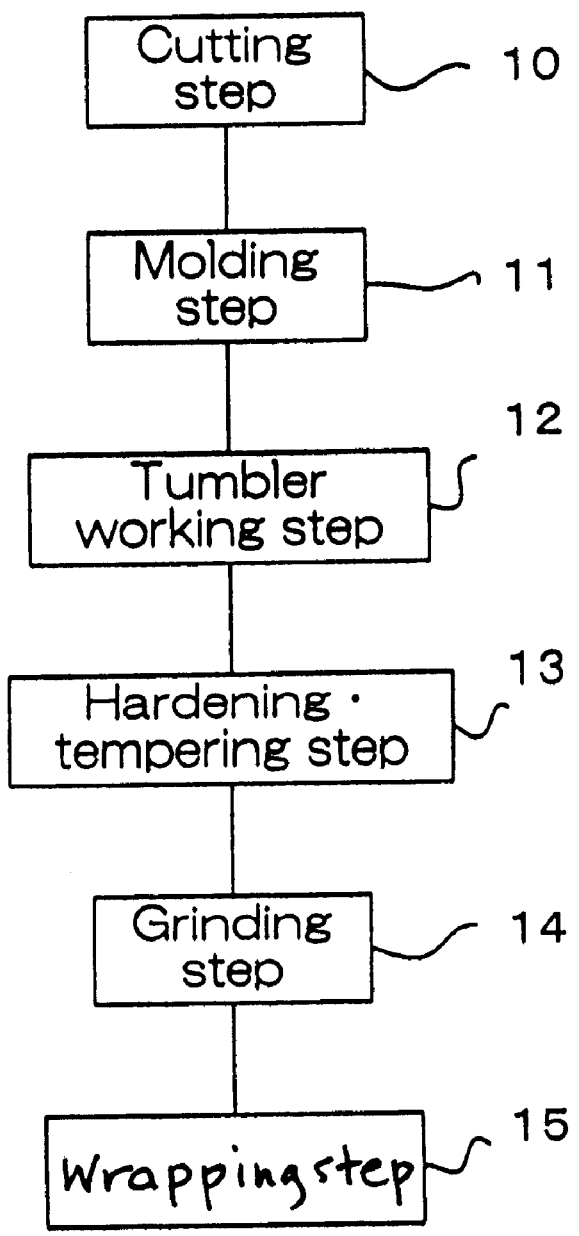

MANUFACTURING METHOD OF STEEL BALL FOR ROLLING BEARING

FIELD OF THE INVENTION

The present invention relates to a method of manufacturing a steel ball for a rolling bearing using a pair of molding forms.

BACKGROUND OF THE INVENTION

In manufacturing a steel ball for a rolling bearing, such molding forms are disposed opposing to each other. The molding forms have respectively hemispherical concave portions on the opposing faces thereof, coupling faces in peripheral edges of the concave portions, and relief grooves formed in the peripheries of the concave portions.

The method of manufacturing the steel ball will be described. A steel wire having a required wire diameter is provided. A fiber flow exists in a lengthwise direction of the steel wire. The fiber flow is constituted by a number of fiber type of metallic texture along with the lengthwise direction of the steel wire. The steel wire is cut at a constant length in accordance with the size of the steel ball to be manufactured.

The steel wire thus cut is housed in the hemispherical concave portions of the both opposing faces of the molding forms and then is molded into a spherical shape by being compressed by the concave portions. This spherically formed steel wire is referred to as a raw ball in the present specification. On the occasion of such a molding, the fiber flow on the surface of the steel wire is relieved by the relief grooves and bent outward. Thereby an annular protrusion or band portion constituted by the fiber flow bent outward is formed on the surface of the raw ball removed from the molding forms.

There is a step of executing a deburring operation to the surface of the raw ball. The fiber flow of the band portion is synchronously cut by the deburring operation in some cases. A strength of the band portion reduces when the fiber flow thereof has been cut. The steel ball manufactured from such a raw ball has an inferior durability as a rolling element of a rolling bearing. Moreover, since the band portion from the surface of the steel ball protrudes, the band portion easily collides with a raceway surface of the rolling bearing so as to easily generate a noise. Thus it is preferable to remove the band portion from the surface of the raw ball without cutting the fiber flow in consideration of manufacturing cost efficiency.

SUMMARY OF THE INVENTION

Therefore, a main object of the present invention is to provide a method of manufacturing a steel ball for a rolling bearing which can remove a band portion from a surface of a raw ball without cutting a fiber flow on a low manufacturing cost, thereby having a high durability and a low noise level during use.

In summary, a method of manufacturing a steel ball for a rolling bearing in accordance with a first aspect of the present invention comprises: a molding step of forming a steel wire cut at a predetermined length into a raw ball having a band portion by a pair of molding forms having respectively hemispherical concave portions and relief grooves in peripheries of said concave portions on their respective opposing faces, said band portion being formed on a surface of said raw ball along said relief grooves by compressing said steel wire by said molding forms in a state in which both ends of said steel wire are sandwiched between said concave portions; and a tumbler working step of removing said band portion from the surface of the raw ball by tumbling.

According to the first aspect of the present invention, the band portion is compressed and can be prevented from protruding from the surface of the raw ball thereby. In this case, different from a deburring operation, a fiber flow is not cut. The fiber flow exists on the surface of the raw ball without being cut, which enables manufacturing a steel ball having an improved rolling durability as a rolling element of a rolling bearing from the raw ball. Also, due to the absence of the band portion, it is possible to manufacture the steel ball which does not produce a noise caused by the collision of the band portion when rolling on a raceway surface of the rolling bearing. Further, since the band portion is simply compressed, a manufacturing cost can be reduced to a reasonable level. Also, the compression of the band portion impart a compression residual stress to the surface of the raw ball. As a result, the hardness of the raw ball increases according to the compression residual stress so as to improve the rolling life of the raw ball thereby.

Moreover, since the deburring operation is synchronously executed in the tumbler working step, the conventional deburring operation can be dropped out and a further manufacturing cost reduction can be realized. Since the deburring operation is not included, the cut portion of the fiber, which is subject to a cause of a breakage such as a surface flaking and the like, can be prevented from an exposure to the surface. In case of the tumbler working step, it is unnecessary to prepare a special type of molding form, which does not generate the band portion in order for a step of removing the band portion of the raw ball. Furthermore, a large amount of a grinding cost in order to remove the entire fiber flow bent with respect to the raw ball is unnecessary, whereby the manufacturing cost of the steel ball can be reduced.

As a preferred embodiment of the first aspect of the present invention, the tumbler working step is the working operation of housing the raw ball together with a medium within a drum and rotating the drum.

As a more preferred embodiment of the first aspect of present invention, a material of the steel wire is a steel material selected from a group composed of a high-carbon chromium bearing steel, a stainless steel a case hardening steel and a high-speed tool steel.

2) A method of manufacturing a steel ball for a rolling bearing in accordance with a second aspect of the invention comprises a molding step of forming a steel wire cut at a predetermined length into a raw ball having a band portion by a pair of first molding forms having respectively hemispherical concave portions and relief grooves in peripheries of said concave portions on their respective opposing faces, said band portion being formed on a surface of said raw ball along said relief grooves by compressing said steel wire by said molding forms in a state in which both ends of said steel wire are sandwiched between said concave portions of said first molding forms; and a pressing step of pressing said band portion by compressing said raw ball by a pair of second molding forms having respectively hemispherical concave portions and coupling faces in a state in which said band portion is obliquely arranged with respect to said coupling faces of the second molding forms and the raw ball is sandwiched between said concave portions of said second molding forms.

In this case, the raw ball may be gripped and in a state the band portion is disposed perpendicularly to coupling faces of the second molding forms in the pressing step.

In accordance with the second aspect of the present invention, as a consequence that the band portion of the raw ball is removed by being pressed so as to make the surface thereof smooth, the rolling durability improves and the steel ball which does not produce a noise caused by the collision with a raceway surface of a rolling bearing. Since the band portion of the raw ball is removed in the pressing step, it is unnecessary to prepare a special type of a molding form which does not produce a band portion. Also, a great deal of a grinding cost to remove an entire bent fiber flow becomes unnecessary, and consequently, the manufacturing cost can be reduced. Furthermore, since the pressing step does not comprise the conventional deburring operation, it is possible to intend to reduce the manufacturing cost. The absence of the deburring operation can prevent the cut portion of the fiber from being exposed to the surface, which can easily be a cause of a breakage such as a surface flaking and the like.

As a preferred embodiment of the second aspect of the present invention, the pressing step is repeated plural times. The repetition of the pressing step enables the surface of the raw ball to be smoother and therefore the band portion to be removed without fail. The rolling durability of a rolling bearing further improves and a noise can certainly be prevented, whereby the manufacturing cost can be reduced.

As a more preferred embodiment of the second aspect of the present invention, the first molding forms of a molding step and the second molding forms of a pressing step are common molding forms. In this manner, because the first molding forms and the second molding forms are common ones, it is unnecessary to prepare plural types of molding forms in both of the steps. Therefore, the manufacturing step can be simplified so as to intend to reduce the manufacturing cost thereby.

3) A steel ball for a rolling bearing of the present invention is structured such that a convex band portion formed on a circumference perpendicular to a circumference connecting between said polar portions thereof have been removed.

According to the steel ball for the rolling bearing of the present invention, it is possible to prevent the surface of the steel ball from flaking in the band portions during use and the rolling durability improves thereby. Further, it is possible to prevent a noise caused by a collision of the band portion of the steel ball with a raceway surface of the rolling bearing.

Additionally, in the step of manufacturing this steel ball it is preferable not to include the deburring operation applied by cutting using a flushing and the like in order to prevent the cut portion of the fiber from being exposed to the surface, which is subject to a cause of a breakage such as a surface flaking and the like.

BRIEF DESCRIPTION OF THE DRAWINGS

These and other objects as well as advantages of the invention will become clear by the following description of preferred embodiments of the invention with reference to the accompanying drawings, wherein:

FIG. 1 is a flow chart of a manufacturing step of a steel ball for a rolling bearing according to a first preferred embodiment of the present invention.

In all these figures, like components are indicated by the same numerals

DETAILED DESCRIPTION OF PREFERRED EMBODIMENTS

In reference to FIG. 1, a manufacturing method of a steel ball for a rolling bearing according to a first preferred embodiment of the invention comprises a cutting step 10, a molding step 11, a tumbler working step 12, a hardening and tempering step 13, a grinding step 14 and a wrapping step 15.

Cutting Step 10

Figure 2:
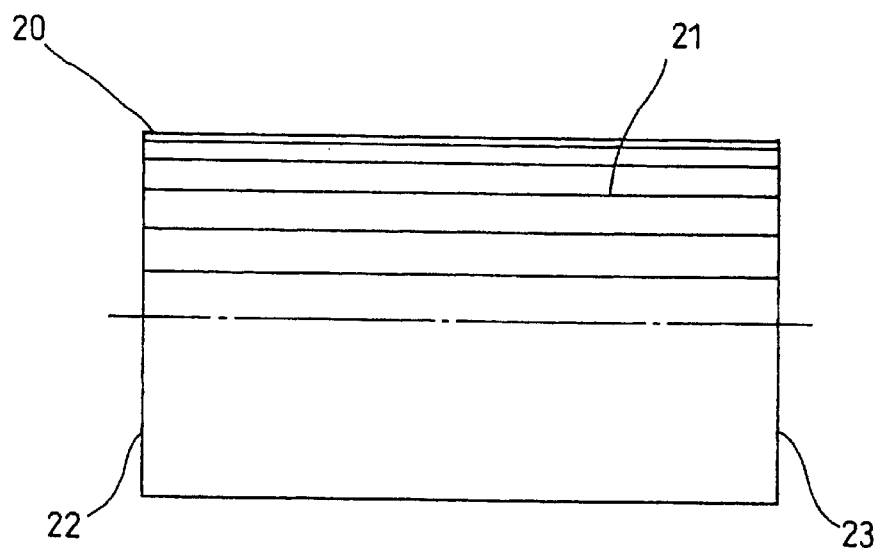
FIG. 2 is a front elevational view of a steel wire cut at a predetermined length in a cutting step shown in FIG. 1.

In the cutting step 10, a steel wire is cut at a predetermined length by a header molding machine not shown in the figure. In FIG. 2, reference numeral 20 denotes the cut steel wire, 21 denotes a fiber flow existing on a surface of the steel wire 20 and in a lengthwise direction thereof, and 22 and 23 denote both ends of the steel wire 20 in the lengthwise direction thereof. The cut surface of both ends of the steel wire 20 is of an annular shape. The fiber flow 24 is practically unseen or hard to be seen, however, shown in plural lines with respect to the surface of the steel wire 20 for easy comprehension.

Molding Step 11

Figure 3:
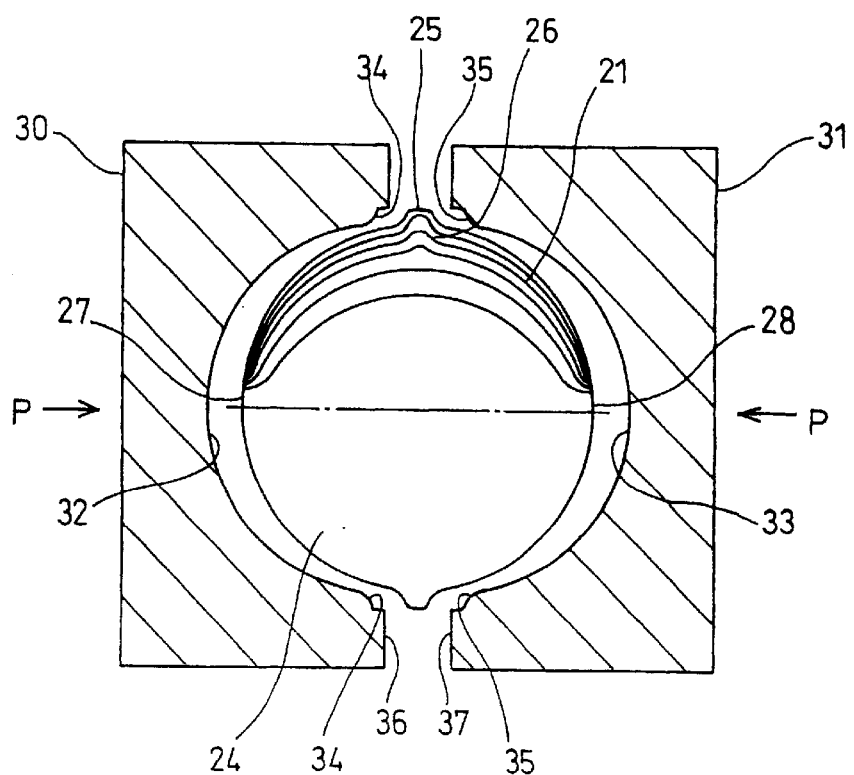
FIG. 3 is an front elevational view in section of a pair of molding forms used in a molding step shown in FIG. 1.

In the molding step 11, as shown in FIG. 3, the cut steel wire 20 shown in FIG. 2 is disposed in a state that the both ends 22 and 23 thereof are sandwiched between a pair of molding forms 30 and 31. The molding forms 30 and 31 are respectively of a cuboidal shape not shown. The forms have respectively hemispherical concave portions 32 and 33 on opposing faces thereof, flat coupling faces 36 and 37 in peripheries of the concave portions 32 and 33, annular relief grooves 34 and 35 formed in the peripheries of the concave portions 32 and 33. The relief grooves 34 and 35 are indispensable grooves in order to form a steel ball from the steel wire 20.

In this case, in FIG. 3, the molding forms 30 and 31 show a front elevational structure in section by a hatching, while the steel wire 20 is not directly shown and a front elevational structure in section of a raw ball 24 formed from the steel wire 20 is shown. The raw ball 24 is not shown with a hatching for showing the sectional view thereof and the fiber flow 21 is shown with the hatching for comprehension of the status.

Figure 4:
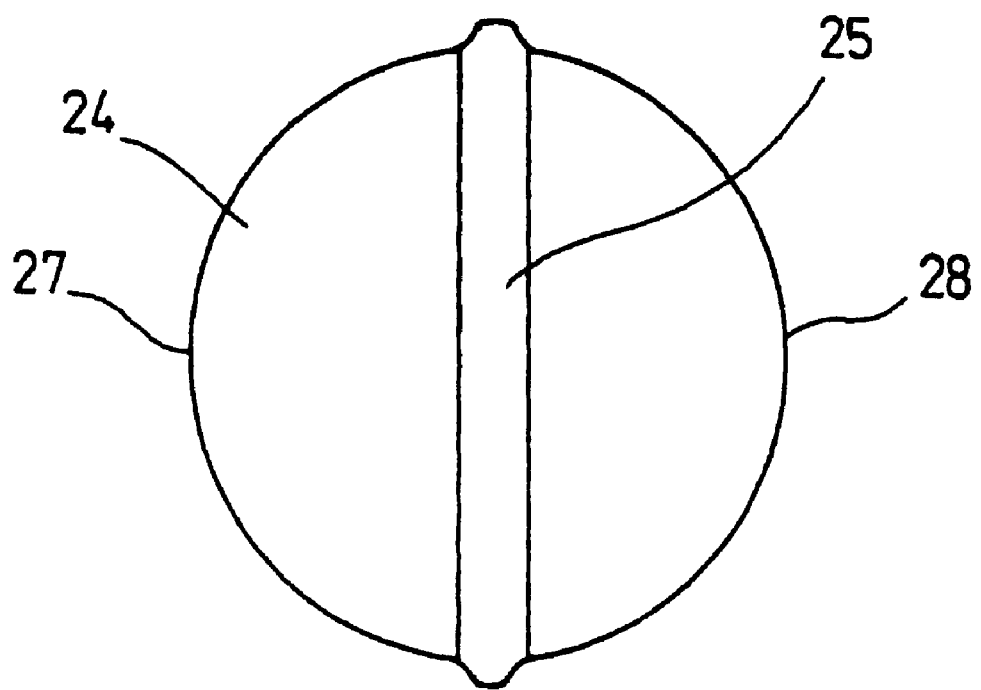
FIG. 4 is a front elevational view of a raw ball molded in a molding step shown in FIG. 1.

The both ends 22 and 23 of the steel wire 20 are sandwiched by the concave portions 32 and 33 of the molding forms 30 and 31 and compressed in a direction marked by an arrow P by the molding forms 30 and 31. In this manner, the steel wire 20 is molded into a raw ball 24 by the concave portions 32 and 33 of the molding forms 30 and 31. The steel wire 20 is not shown in FIG. 3, wherein only the raw ball 24 is shown. On the occasion of the molding step, the fiber flow 21 on the surface of the raw ball 24 barge into the relief grooves 34 and 35, and band portions 25 along the relief grooves 34 and 35 are formed on a surface of the raw ball 24 thereby. In this case, the both relief grooves 34 and 35, being formed on peripheral edges of the concave portions 32 and 33, are structured in an annular groove. At the time of the compression of the steel wire 20, the fiber flow 21 on the surface of the steel wire 20 is formed into an annular protrusion 26 which are bent outward so as to be formed by the relief grooves 34 and 35. The both ends 22 and 23 of the steel wire 20 compose polar portions 27 and 28 of the raw ball 24. In FIG. 3, a dot-dash line connecting between the center of the polar portions 27 and 28 is shown to help comprehension. In FIG. 4, an appearance of the raw ball 24 removed from the molding forms 30 and 31 is shown. The raw balls 24 in FIG. 3 and FIG. 4 are shown in the same arrangement.

Tumbler Working Step 12

Figure 5:
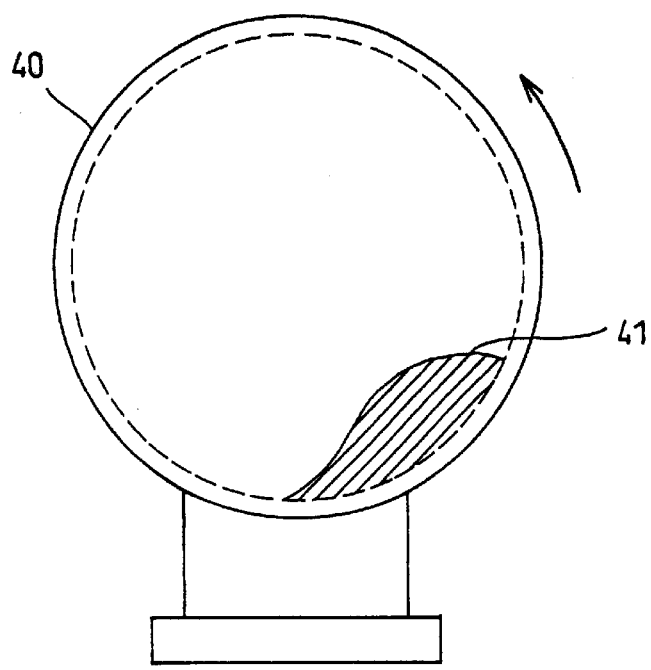
FIG. 5 is a front elevational view of a drum used in a tumbler working step shown in FIG. 1.
Figure 6:
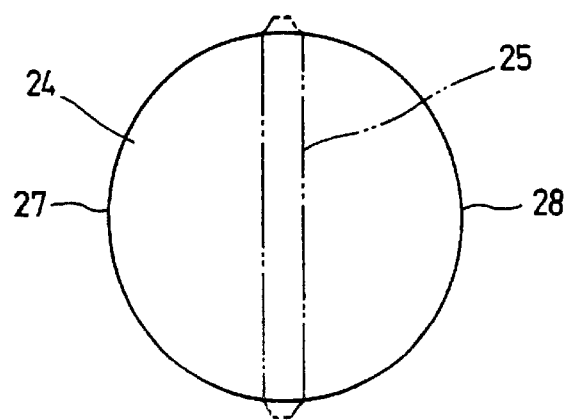
FIG. 6 is a front elevational view of a raw ball after a tumbler working step shown in FIG. 1.

The band portion 25 of the raw ball 24 is removed in this tumbler working step 12. In this step, as shown in FIG. 5, a plurality of the raw balls 24 are housed in a drum 40 with a tumbling medium 41. The thickness of this drum 40 is shown in an outward appearance line drawn in a solid line and a broken line drawn in an inner side of the appearance line. The drum 40 is rotated at a required rotational speed in an arrow mark direction, whereby the raw balls 24 are collided with each other. In this case, the medium may be placed in the drum 40. In the tumbler working step 12, the band portion 25 on the surface of the raw ball 24 is compressed by the collision so as to be removed. A compression residual stress is imparted to the surface of each of the raw balls 24. The hardness of the raw ball 24 increases according to the compression residual stress, whereby the rolling life thereof improves. In the tumbler working step 12, the deburring operation is synchronously executed. In FIG. 6, the band portion 25 is shown in a dash-double line and in a state the band portion 25 is removed from the surface of the raw ball 24.

Hardening and Tempering Step 13

In this hardening and tempering step 13, the raw ball 24 is hardened and tempered, whereby a tenacity is imparted to the raw ball 24.

Grinding Step 14

In this step 14, the surface of the raw ball 24 is ground.

Wrapping Step 15

In this step 15, the surface of the raw ball 24 is superfinished.

After a cleaning operation, an appearance inspection and other steps are executed to the raw ball 24, the manufacturing of the steel ball for the rolling bearing is completed.

Figure 7:
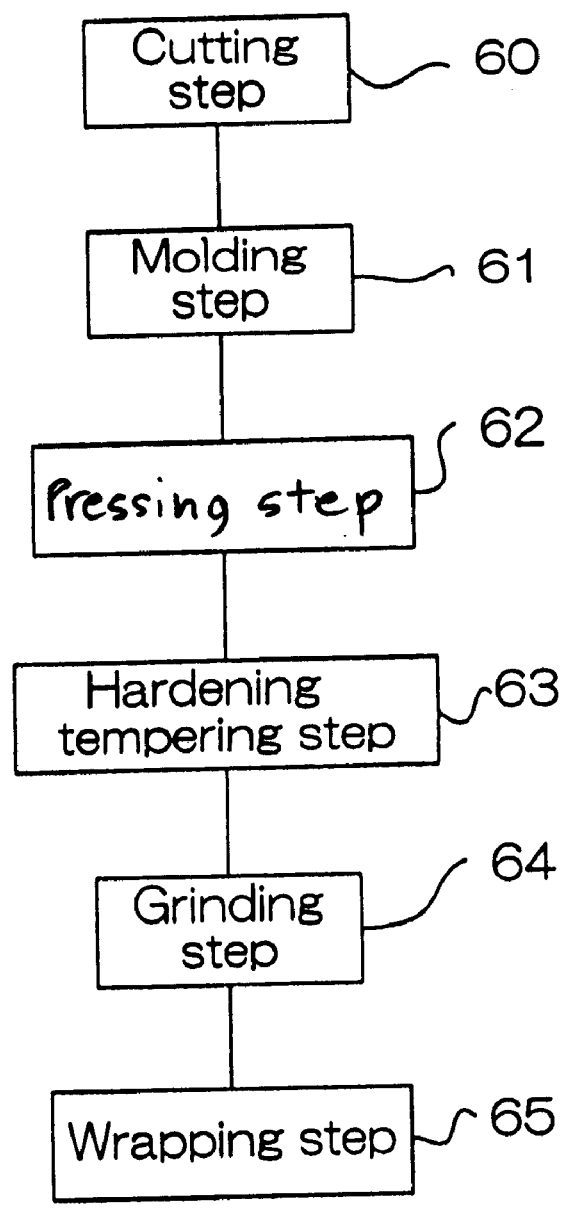
FIG. 7 is a flow chart of a manufacturing step of a steel ball for a rolling bearing according to a second preferred embodiment of the present invention.
Figure 8:
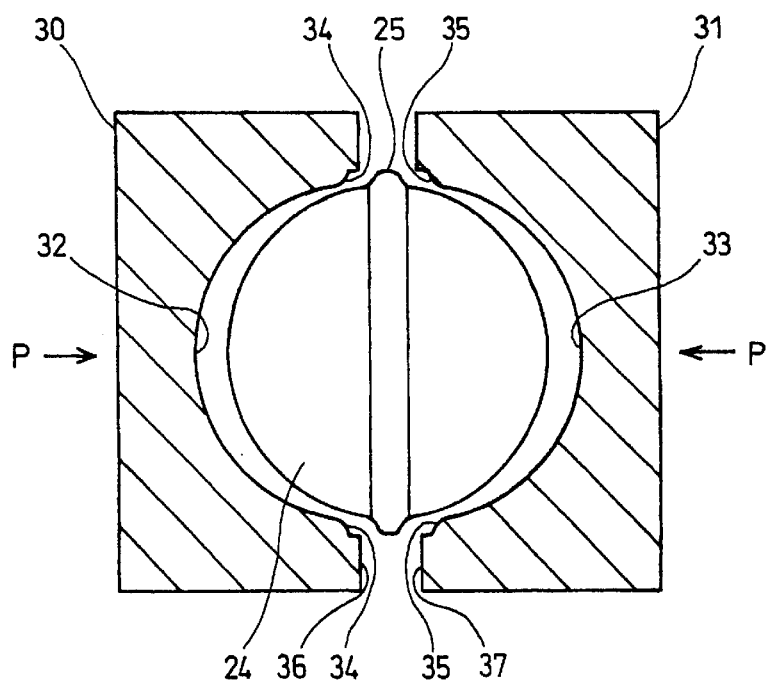
FIG. 8 is a front elevational view in section of a pair of molding forms used in a molding step shown in FIG. 7.
Figure 9:
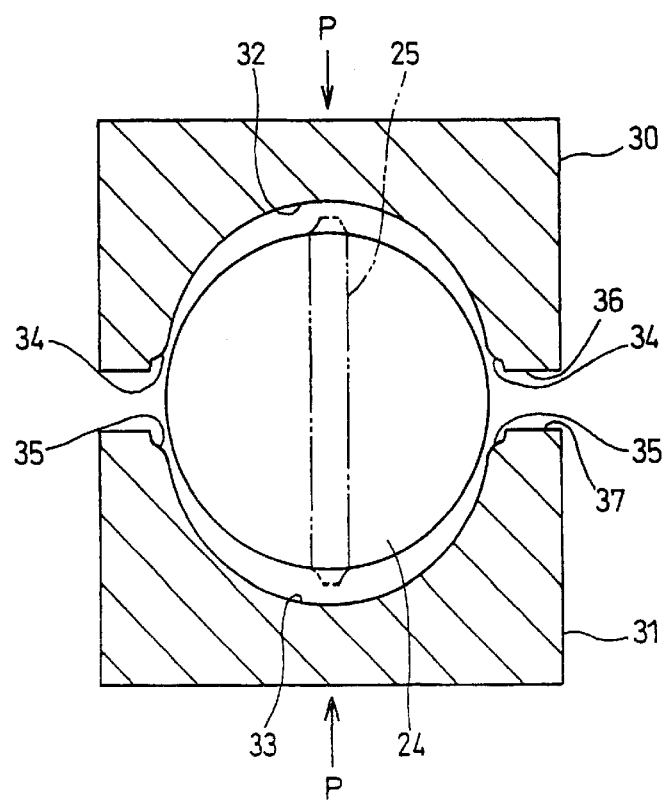
FIG. 9 is a front elevational view in section of a pair of molding forms in a pressing step shown in FIG. 7.

With reference to FIGS. 7 through 9, a second preferred embodiment of the invention will be described. As shown in FIG. 7, the embodiment 2 comprises a cutting step 60, a molding step 61, a pressing step 62, a hardening and tempering step 63, a grinding step 64 and a wrapping step 65.

Cutting Step 60

In the cutting step 60, a steel wire is cut at a predetermined length by a header molding machine. This cutting step 60 is a step similar to the cutting step 10 in the embodiment 1.

Molding Step 61

In the molding step 61, as shown in FIG. 8, the steel wire cut in the cutting step 60 by a pair of molding forms 30 and 31 is molded into a raw ball 24 by a pair of molding forms 30 and 31. The molding step 61 is a step similar to the molding step 11 in the embodiment 1. A band portion 25 is formed on a surface of the raw ball 24 along relief grooves 34 and 35.

Pressing Step 62

In the pressing step 62, the molding forms 30 and 31 used in the molding step 61 are provided. As shown in FIG. 9, the raw ball 24 is rotated through 90 degrees with respect to the molding forms 30 and 31. In this case, in FIGS. 8 and 9, it appears that the molding forms 30 and 31 are rotated through 90 degrees with respect to the raw ball 24. In this manner, the raw ball 24 and the molding forms 30 and 31 may be relatively rotated through 90 degrees.

Through such rotation, the band portion 25 is disposed perpendicular to coupling faces 36 and 37 of the molding forms 30 and 31. In this state, the raw ball 24 is compressed from an arrow mark P direction by the molding forms 30 and 31. As a result of that, the band portion 25 is pressed and thus the surface of the raw ball 24 becomes smooth. The band portion 25, which existed on the surface of the raw ball 24 as shown in FIG. 8 prior to the pressing, is pressed by this pressing step 62 so as to be removed. In FIG. 9, the original position of the band portion 25 is shown using a double-dot dashed line. The raw ball 24 can synchronously be deburred in the pressing step 62. Then the pressing step 62 can include the conventional deburring operation step therein.

Additionally, the band portion 25 is relatively disposed perpendicular to the coupling faces 36 and 37 of the molding forms 30 and 31 in the pressing step 62, however, is not limited to the perpendicular disposition. For example, the band portion 25 can be pressed effectively in the perpendicular disposition, however, can as well be pressed in a state of being sandwiched at a tilting angle other than 90 degrees so as to make the surface of the raw ball to be smooth.

The pressing step 62 may not be limited to once and may be repeated twice or more. More specifically, after the pressing step, the band portion 25 may be removed after being compressed again in an identical position, or may be removed after being repeatedly compressed in different angles. The molding forms 30 and 31 used in the molding step 61 and the molding forms 30 and 31 used in the pressing step 62 are identical, however, may be different types of molding forms. In other words, the molding forms used in the pressing step 62 may not have the relief grooves 34 and 35 in the peripheries of the hemispherical concave portions 32 and 33.

Hardening and Tempering Step 63

In this step 63, hardening and tempering are executed to the raw ball 24.

Grinding Step 64

In this step 64, the surface of the raw ball 24 is ground.

Wrapping Step 65

In this step 65, the surface of the raw ball 24 is superfinished. After a cleaning operation and an appearance inspection are executed to the raw ball 24, the raw ball 24 becomes the steel ball for the rolling bearing.

EXAMPLES

Some examples will be described. A steel ball was manufactured in a size of ⅜ inches (9.525 mm) and by a high-carbon chromium bearing steel of a grade of G20.

Example 1

In a method shown in the embodiment 1, bearing samples A1 and A2 were manufactured. The time required for a tumbler step in case of the bearing sample A1 is two hours, and four hours in case of the bearing sample A2.

Example 2

In a method shown in the embodiment 2, bearing samples B1 and B2 were manufactured. The number of compression in a pressing step in case of the bearing sample B1 is once, and twice in case of the bearing sample B2 in a position shown in FIG. 9.

Comparative Example

In the conventional step, a bearing sample C was manufactured. Different types of tests were executed to the respective bearing samples A1, A2, B1, B2 and C in the examples 1 and 2 and in a comparative example.

Test 1

A steel ball macroscopic test was executed to the bearing samples for each respective type, wherein the existence of the band portion generated by corrosion was detected. The result of the macroscopic test shows that the band portion does not exist in the bearing samples A1, A2, B1 and B2, however does exist in the bearing sample C. Namely, in case of the bearing sample C, since a fiber flow is cut in a deburring step, the trace of corrosion was detected on the band portion. The macroscopic test is in accordance with a macroscopic structure test regulated by JISG0553. The macroscopic structure test regulated by JISG0553 constitutes a method of testing, wherein a surface of a steel is corroded by a hydrochloric acid, a copper chloride ammonium, or an aqua regia, thereby a defective texture existing in the steel such as a dendrite crystal, an ingot pattern, a segregation in a central portion, a porous texture and a pit and the like is tested in a macroscopic manner.

Test 2

Figure 10:
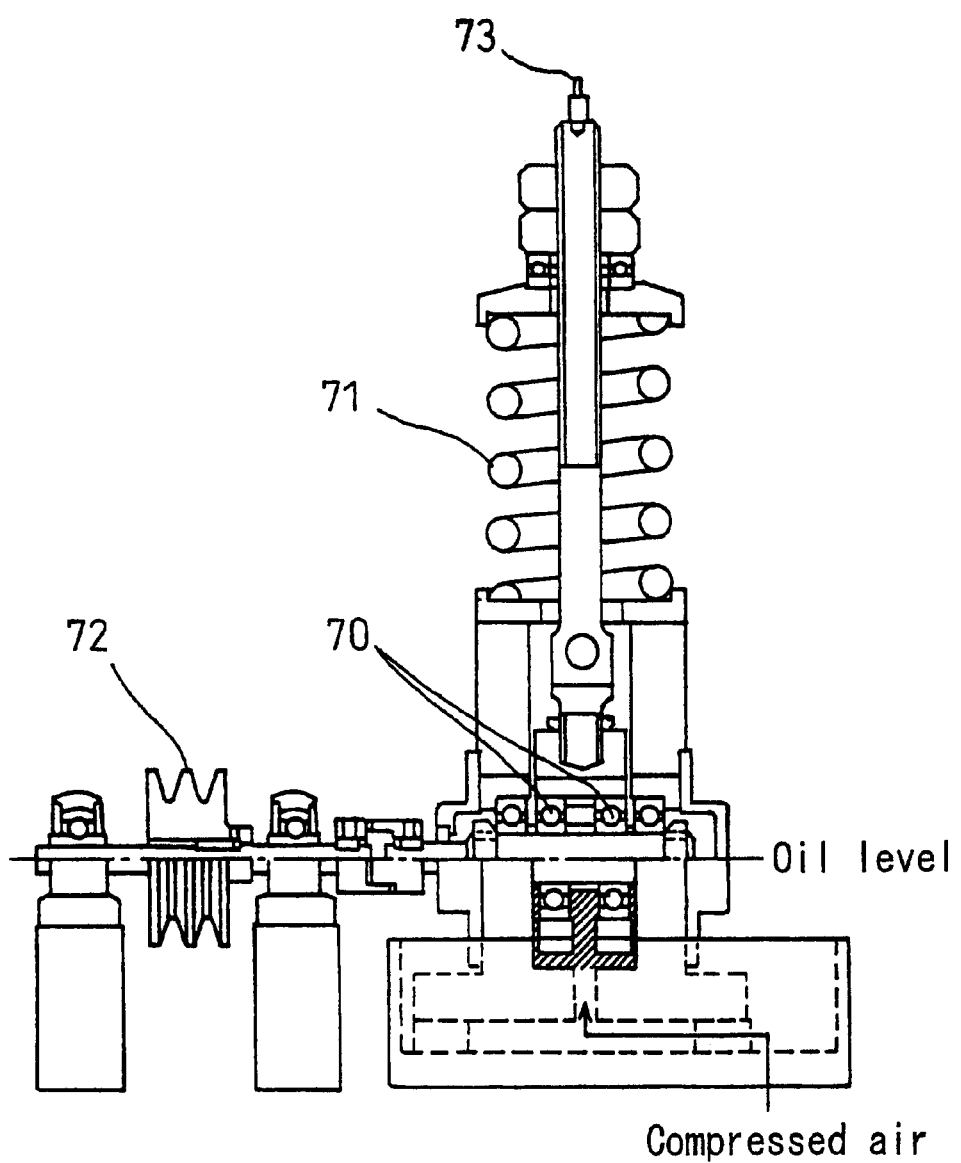
FIG. 10 is a schematic view of a bearing durability testing machine used in a specific embodiment of the present invention.

For each different type of the respective bearing samples A1, A2, B1, B2 and C, only the bearing samples are changed and incorporated so as to manufacture a deep groove ball bearing 6206, whose life was evaluated by the bearing durability testing machine in FIG. 10. The testing machine comprises a structure, wherein a radial load is applied evenly to four bearings. In FIG. 10, 70 shows the bearing sample, 71 shows a load coil spring, 72 shows a driving pulley, 73 shows a vibroscope pick up. In contrast to nine in case of a standard bearing, the number of the steel balls incorporated in the bearing was seven, to which an acceleration test was executed. Conditions of the test are shown in Table 1.

TABLE 1

| Item | Test conditions |
| --- | --- |
| Load(radial) | 7.8 kN |
| Rotational speed | 2,500 r/min |
| Lubrication | Turbin oil VG68 circulation |
| Estimated life | 64. 0h |

Figure 11:
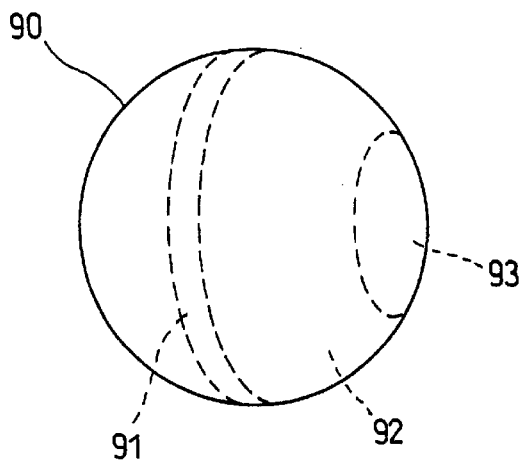
FIG. 11 is a perspective view of a steel ball for a rolling bearing manufactured according to an embodiment shown in FIG. 10.

The test is executed 10 times respectively for the bearing samples A1, A2, B1, B2 and C until either a flaking occurs to the steel ball or a length of the testing time adds up to 15 times as long as an estimated life. The test results are described by a $L_{10}$ life (basic rating life) found by the Weibull distribution and a ratio of a flaking position. As shown in FIG. 11, it was confirmed which portion the flaking position of a steel ball 90 corresponded to, a band portion 91 (in case of the embodiments 1 and 2, a position which is judged to correspond to a band portion from a relative position with respect to polar portions), a shoulder portion 92 or a polar portion 93

Test 3

The variation of a vibration during the bearing durability test shown in FIG. 1 was researched by an accelerating vibration pick up 73 mounted in a nose end portion of a load bar of the testing machine. The vibration increases according to a variation of a raceway surface of the bearing as well as a length of the testing time. Therefore, the vibration shows a status variation of the raceway surface of the steel ball.

Test Results

The results of the test 1 and 2 are shown in Table 2. With respect to the bearing samples A1, A2, B1 and B2, since the fiber flow thereof was smooth and the band portions were not detected, it is known as a result that a life of a rolling fatigue thereof excels. More specifically, in more cases, as well as the flaking on the band portions of the bearing sample C reduced, a length of the testing time reached 15 times as long as the estimated life, when the test was terminated. The $L_{10}$ life improved.

TABLE 2

| | | Bearing durability test results | | | | |
| --- | --- | --- | --- | --- | --- | --- |
| | | | Steel ball flaking position | | | |
| Division Example | Band portion | $L_{10}$ life (compared to estimated-life) | Band portion or portion corresponding to band portion | Shoulder portion | Polar portion | Test terminated |
| A1 | Not detected | 9.1 times | 2 | 2 | 3 | 3 |
| A2 | Not detected | 10.2 times | 1 | 2 | 3 | 4 |
| B1 | Not detected | 11.0 times | 1 | 2 | 3 | 4 |
| B2 | Not detected | 12.8 times | 0 | 2 | 3 | 5 |
| Comparative example C | Detected | 4.7 times | 4 | 2 | 3 | 1 |

Figure 12:
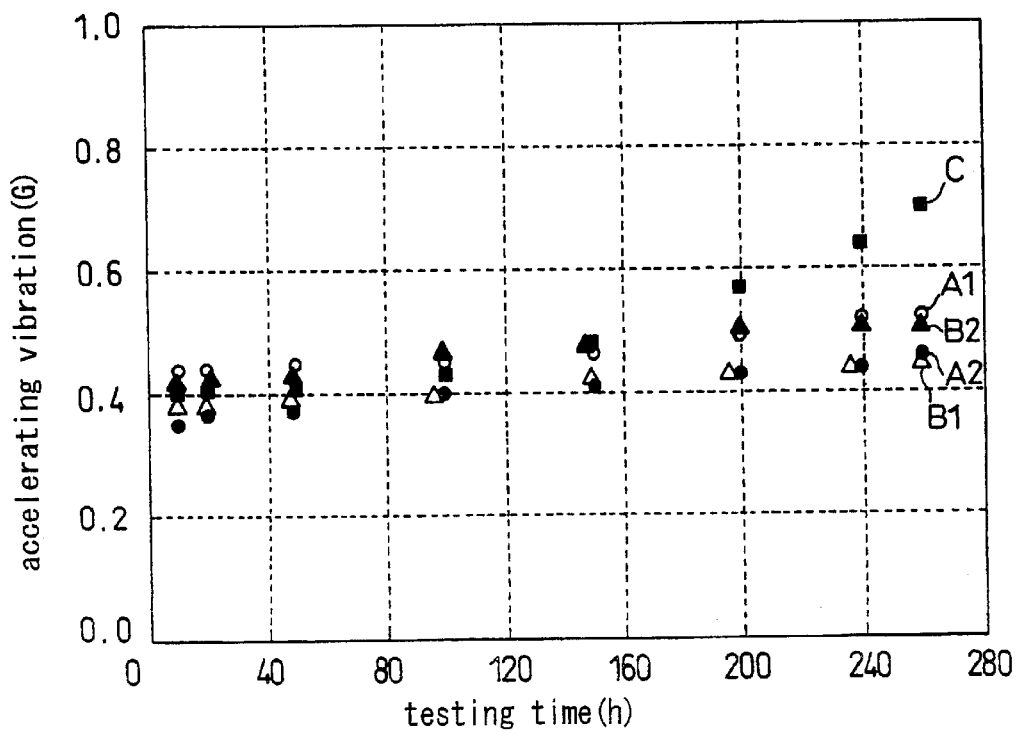
FIG. 12 is a graph showing a variation of an accelerating vibration during a bearing durability test in an embodiment shown in FIG. 10.

As a result of the test 2, as shown in FIG. 12, all the bearings identically vibrated immediately after the test commenced. However, in the passage of the testing time, there was more increase in the vibration of the bearing of the comparative example, and it was known that the bearing samples A1, A2, B1 and B2 excelled in terms of a smaller noise level during use. The unit of the testing time (h) in FIG. 12 is hour.

In addition, with regard to the description of a SUJ2 steel ball, an influence from a fiber flow was the same in any other kind of steel. Therefore, the kind of steel is not limited to SUJ2, however may be a bearing steel SUJ3 and the like, a stainless steel such as SUS440C and the like, a case hardening steel, a high-speed stool steel and the like, wherein similar effects were obtained.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A method of manufacturing a steel ball for a rolling bearing, said method comprising:

providing a pair of molding forms having, respectively, hemispherical concave portions and relief grooves in peripheries of said concave portions on respective opposing faces thereof, said pair of molding forms being urgeable together along a compression axis;

arranging a steel wire segment of predetermined length between said pair of molding forms, said steel wire segment having a fiber flow running in a lengthwise direction thereof, said steel wire segment being positioned in said concave portions such that said lengthwise direction is co-directional with said compression axis;

urging together said pair of molding forms to compress said steel wire segment into a raw ball having a raised band portion formed on a surface of said raw ball along a region thereof corresponding to said relief grooves ;and removing said band portion from the surface of the raw ball by tumbling.

2. A method according to claim 1, wherein said step of removing includes:

housing the raw ball in a drum; and rotating the drum.

3. A method according to claim 1, wherein a material for the steel wire segment is selected from the group consisting of a high-carbon chromium bearing steel, a stainless steel, a case hardening steel and a high-speed tool steel.

4. A method of manufacturing a steel ball for a rolling bearing, said method comprising:

providing a pair of first molding forms having, respectively, hemishperical concave portions and relief grooves in peripheries of said concave portions on respective opposing faces thereof, said pair of first molding forms being urgeable together along a first compression axis;

arranging a steel wire segment of predetermined length between said pair of first molding forms, said steel wire segment having a fiber flow running in a lengthwise direction thereof, said steel wire segment being positioned in said concave portions such that said lengthwise direction is co-directional with said first compression axis;

urging together said pair of first molding forms to compress said steel wire segment into a raw ball having a band portion formed on a surface of said raw ball along a region thereof corresponding to said relief grooves;

providing a pair of second molding forms having respectively hemispherical concave portions and coupling faces which are moved closer to one another when said pair of first molding forms are urged together;

arranging said raw ball within said concave portions of said pair of second molding forms with said band portion obliquely positioned with respect to said coupling faces of said pair of second molding forms; and pressing said band portion by urging together said pair of second molding forms to thereby at least partially remove said band portion.

5. A method according to claim 4, wherein said step of pressing includes positioning the band portion approximately perpendicularly with respect to the coupling faces of the pair of second molding forms to sandwich and compress the raw ball when said pair of second molding forms are urged together.

6. A method according to claim 4, wherein said step pressing is repeated plural times.

7. A method according to claim 4, wherein a common pair of molding forms serves as both said pair of first molding forms and said pair of second molding forms, said opposing faces and said coupling faces being a common pair of faces of said common pair of molding forms when said common pair of molding forms is urged together during said steps of urging together and pressing.

8. A steel ball for a rolling bearing, manufactured by the method according to any of claims 1 through 7, said raw ball having polar portions formed in a position thereon corresponding to opposed ends of said steel wire segment and the band portion being formed, prior to subsequent removal thereof, on a circumference perpendicular to a circumference connecting between said polar portions.

9. A method according to claim 4, further comprising:

re-arranging said raw ball on which said band portion has been at least partially removed within said concave portions of said pair of second molding forms in another position in which said band portion is obliquely positioned with respect to said coupling faces of said pair of second molding forms; and repeating said step of pressing.

10. A method according to claim 9, wherein said steps of rearranging and repeating are carried out at least twice.

11. A method according to claim 4, wherein peripheries of said concave portions of said pair of second molding forms are substantially free of relief grooves on respective coupling faces thereof.

12. A method according to claim 1, wherein said step of housing includes disposing a plurality of said raw balls in said drum along with a tumbling medium.

* * * * *